(12) United States Patent
Pathirane et al.

(10) Patent No.: US 8,051,323 B2
(45) Date of Patent: Nov. 1, 2011

(54) AUXILIARY CIRCUIT STRUCTURE IN A SPLIT-LOCK DUAL PROCESSOR SYSTEM

(75) Inventors: Chiloda Ashan Senerath Pathirane, Haverhill (GB); Antony John Penton, Cambridge (GB)

(73) Assignee: ARM Limited, Cambridge (GB)

(*) Notice: Subject to any disclaimer, the term of this patent is extended or adjusted under 35 U.S.C. 154(b) by 119 days.

(21) Appl. No.: 12/656,247

(22) Filed: Jan. 21, 2010

(65) Prior Publication Data
US 2011/0179308 A1    Jul. 21, 2011

(51) Int. Cl.
*G06F 11/00* (2006.01)
(52) U.S. Cl. ............................ 714/10; 714/11
(58) Field of Classification Search ............... None
See application file for complete search history.

(56) References Cited

U.S. PATENT DOCUMENTS

| | | | |
|---|---|---|---|
| 6,330,701 B1* | 12/2001 | Rosendahl et al. | 714/757 |
| 6,363,453 B1 | 3/2002 | Esposito et al. | |
| 6,434,712 B1 | 8/2002 | Urban et al. | |
| 6,615,366 B1* | 9/2003 | Grochowski et al. | 714/10 |
| 6,640,313 B1* | 10/2003 | Quach | 714/10 |
| 7,206,966 B2 | 4/2007 | Barr et al. | |
| 7,222,064 B1 | 5/2007 | Sollom et al. | |
| 7,383,463 B2 | 6/2008 | Hayden et al. | |
| 2002/0073357 A1* | 6/2002 | Dhong et al. | 714/19 |
| 2002/0133751 A1* | 9/2002 | Nair et al. | 714/38 |
| 2003/0120896 A1 | 6/2003 | Gosior et al. | |
| 2004/0003021 A1* | 1/2004 | Safford et al. | 709/104 |
| 2004/0019771 A1* | 1/2004 | Quach | 712/229 |
| 2004/0025078 A1* | 2/2004 | Nagano et al. | 714/11 |
| 2005/0240793 A1* | 10/2005 | Safford et al. | 714/1 |
| 2005/0240810 A1* | 10/2005 | Safford et al. | 714/10 |
| 2005/0240811 A1* | 10/2005 | Safford et al. | 714/11 |
| 2006/0107117 A1* | 5/2006 | Michaelis et al. | 714/25 |
| 2007/0088979 A1* | 4/2007 | Pomaranski et al. | 714/10 |
| 2007/0240028 A1 | 10/2007 | Davies | |
| 2010/0077259 A1 | 3/2010 | Inoue et al. | |
| 2010/0106448 A1 | 4/2010 | Satterfield et al. | |

OTHER PUBLICATIONS

Office Action mailed May 31, 2011 in co-pending U.S. Appl. No. 12/656,248.
U.S. Appl. No. 12/656,248, filed Jan. 21, 2010, Pathirane et al.
U.S. Appl. No. 12/656,246, filed Jan. 21, 2010, Pathirane et al.
Kottke et al., "A Reconfigurable Generic Dual-Core Architecture", *IEEE Computer Society*, 2006, pp. 45-54.
Baleani et al., "Fault-Tolerant Platforms for Automotive Safety-Critical Applications", *CASES '03*, Nov. 2, 2003, 8 pages.

* cited by examiner

*Primary Examiner* — Gabriel Chu
(74) *Attorney, Agent, or Firm* — Nixon & Vanderhye P.C.

(57) ABSTRACT

A multiple-processor system 2 is provided where each processor 4-0, 4-1 can be dynamically switched between running in a locked mode where one processor 4-1 checks the operation of the other processor 4-0 and a split mode where each processor 4-0, 4-1 operates independently. Multiple auxiliary circuits 8-0, 8-1 provide auxiliary functions for the plurality of processors 4-0, 4-1. In the split mode, each auxiliary circuit 8-0, 8-1 separately provides auxiliary functions for a corresponding one of the processors 4-0, 4-1. To ensure coherency when each processor 4-0, 4-1 executes a common set of processing operations, in the locked mode a shared one of the auxiliary circuits 8-0 provides auxiliary functions for all of the processors 4-0, 4-1.

19 Claims, 5 Drawing Sheets

AUXILIARY CIRCUIT STRUCTURE IN A SPLIT-LOCK DUAL PROCESSOR SYSTEM

BACKGROUND OF THE INVENTION

1. Field of the Invention

The present invention relates to the field of data processing. More particularly, the invention relates to a split-lock processor.

2. Description of the Prior Art

When a data processing apparatus is used in a safety-critical application such as an anti-lock braking system, it is important that the processing system is protected against errors. In "A Reconfigurable Generic Dual-Core Architecture", Kottke and Steininger, pages 45-54, International Conference on Dependable Systems and Networks, 2006, a dual-core split-lock processor is proposed which has two modes of operation. One mode is a safety mode which allows the two cores to run in lock step where each core executes the same set of processing operations with one core acting as a master and the other core acting as a checker. The results of the processing of each core are compared to detect whether an error has occurred. The processor also has a performance mode in which each core independently executes different instruction streams. Thus, the safety mode can be used when safety-critical code is executed and the performance mode can be used to increase processing performance.

In the safety mode, the processors maintain cycle-accurate behaviour with respect to one another. When the processing involves use of an auxiliary circuit, such as a cache, or a translation lookaside buffer, it is important that every transaction that uses the auxiliary circuit elicits the same response. After switching from the performance mode to the safety mode, there is no guarantee that the auxiliary circuits corresponding to each of the processor cores will each give the same response to a given request since it is likely that different data will be held in the respective auxiliary circuits following the split performance mode. While coherency can be achieved by flushing auxiliary circuits such as caches or branch history circuits on entry to the safety mode, this results in a significant performance penalty. The present techniques seek to address this problem and provide a split-lock processor structure that enables each processor to elicit the same response from the auxiliary circuits when in the safety mode, without harming performance significantly.

SUMMARY OF THE INVENTION

Viewed from one aspect the present invention provides a data processing apparatus comprising:

a plurality of processors configured to perform processing operations;

a plurality of auxiliary circuits configured to provide auxiliary functions for said plurality of processors; and comparison circuitry configured to compare processing results of different processors of said plurality of processors; wherein:

said plurality of processors have:

(i) a locked mode of operation in which each of said plurality of processors separately performs a common processing operation to generate respective processing results, said respective processing results of different processors being compared by said comparison circuitry to identify incorrect operation; and (ii) a split mode of operation in which each of said plurality of processors performs a different processing operation to generate respective different processing results;

in said split mode, each of said plurality of auxiliary circuits separately provides auxiliary functions for a corresponding one of said plurality of processors; and in said locked mode, a shared one of said plurality of auxiliary circuits provides auxiliary functions for all of said plurality of processors.

A split-lock processor has a plurality of processors and a plurality of auxiliary circuits for providing auxiliary functions for the processors. The processors have a locked mode of operation in which each processor separately performs common processing operations to enable respective results of different processors to be compared to identify errors, and a split mode of operation in which each processor performs different processing operations to generate different processing results. The locked mode can also be referred to as a safety mode, as this mode is for executing safety-critical code, and the split mode can also be referred to as a performance mode. In the split mode of operation, each processor is connected to its own auxiliary circuit to improve processor performance. In the locked mode, a shared one of the auxiliary circuits is connected to all of the plurality of processors with the other non-shared auxiliary circuits not being used by the processors. The present technique recognises that many auxiliary circuits do not require duplication in order to provide a fault protection. By only using one of the auxiliary circuits to provide the auxiliary functions during the locked mode, it can be ensured that respective requests for auxiliary functions from the auxiliary circuit will return the same response regardless of which processor provides the request. Therefore, complex coherency schemes and auxiliary circuit flushes are unnecessary and so the circuit configuration can be simplified and performance maintained.

The processors may comprise any circuit for performing data processing, and the auxiliary circuits may include any circuit that provides an additional function on behalf of the processors and can be shared between two or more processors.

In an embodiment, the plurality of auxiliary circuits comprise self-protecting circuits having error detection logic for detecting incorrect operation of the self-protecting circuits. Such self-protecting circuits do not require duplication in the split-lock processor in order to provide error protection, and so in the locked mode a single self-protecting circuit can be used by multiple processors without compromising fault detection.

The plurality of auxiliary circuits may comprise a plurality of cache memories. In the split mode, each processor has its own cache which can independently store different sets of data, tags and valid bits. Following the switch to the locked mode, the shared one of the caches is used by all the processors and the other, non-shared, cache(s) are not used. Therefore, each of the processors will be able to access the same data in the cache and so cache coherency problems are avoided. In the split mode each processor, or software running on each processor, has responsibility for avoiding coherency problems, e.g. by not sharing any data.

The plurality of cache memories may be configured to store error detection codes for detecting errors in data stored in the cache memories. The error detection codes provide fault coverage for the cache memories and so duplication of the cache memories in the split-lock system is not necessary. Therefore, the cache memories are suitable for the present technique since only one cache memory can be used in the lock mode without affecting error detection.

The plurality of auxiliary circuits may comprise a plurality of tightly coupled memories. For increased performance, each processor can have its own local storage in a tightly coupled memory during the performance split mode, while during the locked mode each processor uses a single tightly coupled memory to ensure coherency, and the other tightly coupled memories are not used by the processor.

The plurality of tightly coupled memories may be configured to store error detection codes for detecting errors in data stored in the tightly coupled memories. This internal error detection capability means that the tightly coupled memories do not need to be duplicated for the locked mode and so coherency can be maintained by using only one tightly coupled memory during the locked mode.

For the cache memories and tightly coupled memories, the error detection codes may comprise at least one of parity codes for detecting errors in data stored in the cache memories or tightly coupled memories and error correction codes for correcting errors in the data stored in the cache memories or tightly coupled memories.

The plurality of auxiliary circuits may comprise a plurality of debug circuits. Debug circuits are suitable for the present technique because the monitoring operation of the debug circuit does not affect the correctness of the result of the data processors and so the operation of the debug circuit is not critical to safety during non-diagnostic operation. Therefore, it is not necessary to provide separate debug circuits for monitoring each processor in the locked mode and so only a single debug circuit can be used with each processor in the locked mode.

The plurality of auxiliary circuits may also comprise a plurality of branch prediction circuits. The branch prediction circuits are another example of non-safety-critical auxiliary circuits whose operation does not affect the correctness of the processing results of the processors. While the branch prediction circuits increase the performance of the processors, the outcomes (other than timing) of the processing performed by the processors are not affected by the branch prediction operation. Nevertheless, it is desirable that each processor receives the same branch prediction from the branch prediction circuits when a branch instruction is reached. During the split (performance) mode, the respective branch prediction circuits may accumulate different branch histories for each processor as each processor executes its own set of processing operations. On switching to the locked (safety) mode, then if each processor continued to use its own branch prediction circuit, then the different branch histories remaining in each branch prediction circuit following the performance mode could result in different branch predictions being made for each processor and so processors would get out of step with each other. While eventually each processor would reach the same result (and so the branch prediction circuit is not safety-critical), each processor executing corresponding operations at different timings depending on the branch prediction would make comparison between the respective processing results more difficult. Therefore, only one shared branch prediction circuit is used to provide branch predictions to all of the processors during the locked mode and the other non-shared branch prediction circuits are not used during the locked mode. Thus, cycle-accurate execution of the common processing operation is achieved.

The plurality of auxiliary circuits may also comprise a plurality of translation lookaside buffers. Translation lookaside buffers (TLBs) are used to increase the speed of translation between virtual and physical addresses. During the split processing mode, each processor uses its own TLB. During the locked mode a single TLB provides translations for each processor. As the TLB does not affect the correctness of data processing outcomes (if the TLB is missing a relevant entry, then it will typically be fetched), a single TLB can be used in the locked mode without affecting fault protection.

The plurality of auxiliary circuits may also comprise a plurality of data history buffers. The data history buffers can accelerate processing by predicting processing results based on a previous history of processing outcomes. For the same reasons as for the branch prediction circuit, the data history buffer can accumulate different sets of history for different processors in the split mode, and so during the locked mode it is advantageous to use a single data history buffer to provide data history for each processor as each processor executes the same data processing operations, so that cycle-accurate execution can be achieved.

In a further feature, for each non-shared auxiliary circuit of the plurality of auxiliary circuits:
a signal path between said non-shared auxiliary circuit and said corresponding one of said plurality of processors comprises a clamping circuit;
in said split mode, said clamping circuit is configured to allow a processing result output by said corresponding one of said plurality of processors to be transferred to said non-shared auxiliary circuit; and
in said locked mode, said clamping circuit is configured to prevent said processing result output by said corresponding one of said plurality of processors from being transferred to said non-shared auxiliary circuit.

The non-shared auxiliary circuits are the auxiliary circuits other than the shared auxiliary circuit. During the locked mode, each processor interacts with only the shared auxiliary circuit and not the non-shared auxiliary circuits. Clamping circuitry may be provided between the processor and the non-shared auxiliary circuit to prevent processing results output by the processor being transferred to the non-shared auxiliary circuit during the locked mode. This prevents data in the non-shared auxiliary circuits being changed by the processor during the locked mode.

The plurality of auxiliary circuits can be configured to store auxiliary state data on behalf of the plurality of processors during the split mode, and after a switch from the split mode to the locked mode, at least one non-shared auxiliary circuit can continue to store the auxiliary state data that was stored during the split mode. Thus, when the system switches back to the split mode from the locked mode, the processors corresponding to non-shared auxiliary circuits can continue processing based on the state data stored in the auxiliary circuits before entry to the locked mode. Thus, performance mode context can be retained during the locked mode.

In the locked mode, the execution of the common processing operation by a first processor of the plurality of processors may be offset from the execution of the common processing operation by a second processor of the plurality of processors by a fixed number of processing cycles.

The data processing apparatus may be subject to certain instantaneous failures, such as momentary glitches in the power supply or electromagnetic interference. If all cores were completely in step executing the common processing operation, then such a momentary glitch could cause an error in all the cores and so a fault may not be detected. To prevent this, in the locked mode the execution of the common processing operation by a first processor may be offset from the execution of the common processing operation by a second processor by a fixed number of processing cycles. This temporal offset between the two processors means that a momentary fault is unlikely to affect all the processors in the same way and so the error caused by the fault can be detected by a difference between the processing results of the respective processors. If there are more than two processors then similarly processors other than the first and second processors can be offset from each other by a further number of processing cycles. The number of processing cycles does not need to be an integer and can, for example, be a half integer number of processing cycles.

In a further feature, the first processor may execute the common processing operation ahead of the second processor and a signal path between the second processor and the corresponding auxiliary circuit may comprise delaying circuitry for delaying propagation of a signal from the corresponding auxiliary circuit to the second processor by an amount corresponding to the fixed number of processing cycles that represents the temporal offset between the first and second processors executing the common processing operation. By delaying the signal between the auxiliary circuit and the second processor, it is ensured that the value obtained from the auxiliary circuit by the second processor is the same as the value obtained from the auxiliary circuit by the first processor the fixed number of processing cycles earlier. Thus, subsequent changes to the auxiliary circuit value made by the first processor while performing the common processing operation do not affect the second processor's view of the auxiliary circuit until after the second processor has completed the common processing operation, and so coherency is maintained.

It is possible that during the locked mode, the non-shared auxiliary circuits are decoupled from the processors and used for another purpose. However, usually at least one non-shared auxiliary circuit would be inactive while the processors are in said locked mode. By making the non-shared auxiliary circuit (s) inactive, power consumption can be reduced.

Viewed from another aspect, the present invention provides a data processing apparatus comprising:

a plurality of processor means for performing processing operations;

a plurality of auxiliary means for providing auxiliary functions for said plurality of processor means; and comparison means for comparing processing results of different processor means of said plurality of processor means; wherein:

said plurality of processor means have:

(i) a locked mode of operation in which each of said plurality of processor means separately performs a common processing operation to generate respective processing results, said respective processing results of different processor means being compared by said comparison means to identify incorrect operation; and (ii) a split mode of operation in which each of said plurality of processor means performs a different processing operation to generate respective different processing results;

in said split mode, each of said plurality of auxiliary means separately provides auxiliary functions for a corresponding one of said plurality of processor means; and in said locked mode, a shared one of said plurality of auxiliary means provides auxiliary functions for all of said plurality of processor means.

Viewed from a further aspect the present invention provides a data processing method comprising the steps of:

performing processing operations using a plurality of processors;

providing auxiliary functions for said plurality of processors using a plurality of auxiliary circuits;

in a locked mode of operation, separately performing a common processing operation with each of said plurality of processors to generate respective processing results, and comparing said respective processing results of different processors to identify incorrect operation; and in a split mode of operation, performing a different processing operation with each of the plurality of processors to generate respective different processing results; wherein:

in said split mode, each of said plurality of auxiliary circuits separately provides auxiliary functions for a corresponding one of said plurality of processors; and in said locked mode, a shared one of said plurality of auxiliary circuits provides auxiliary functions for all of said plurality of processors.

The above, and other objects, features and advantages of this invention will be apparent from the following detailed description of illustrative embodiments which is to be read in conjunction with the accompanying drawings.

DESCRIPTION OF THE PREFERRED EMBODIMENTS

Figure 1:
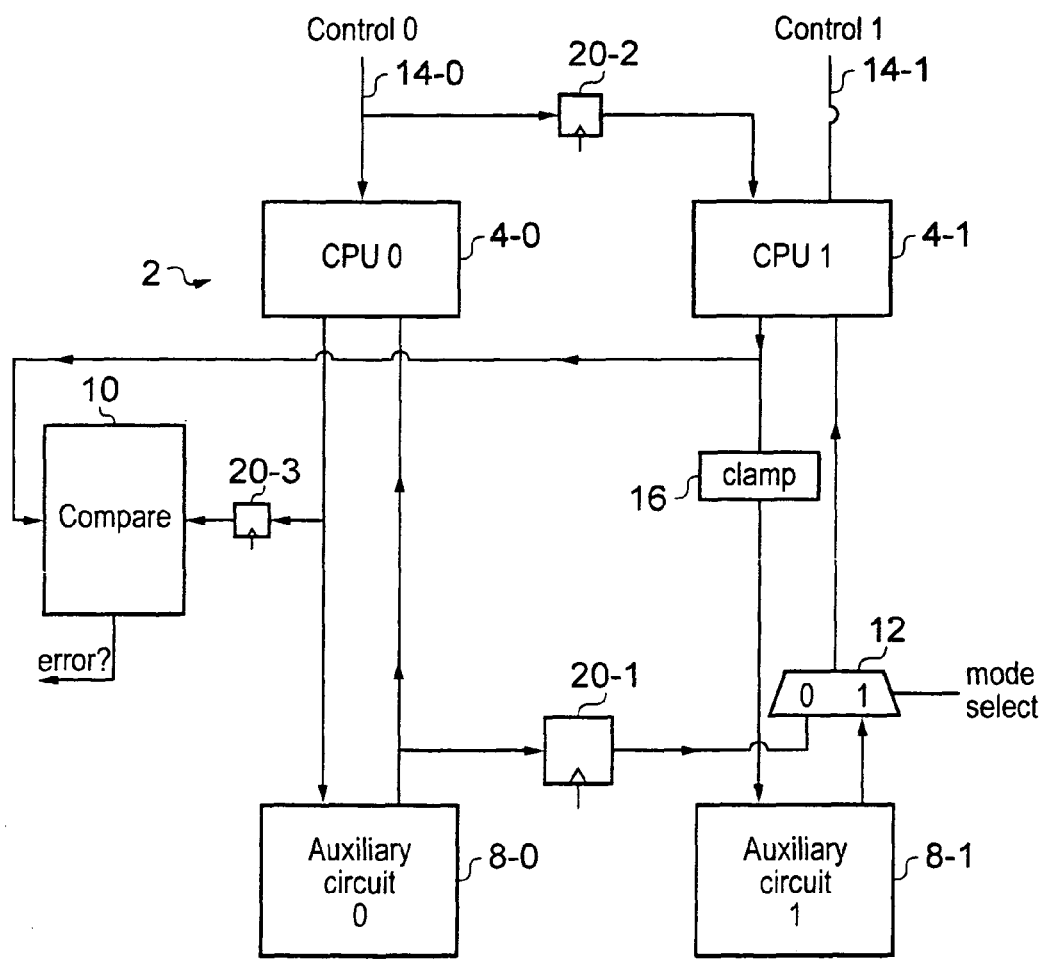
FIG. 1 illustrates a dual-processor operable in a split mode in which each processor uses a respective auxiliary circuit and a locked mode in which each processor uses a single shared auxiliary circuit.

FIG. 1 illustrates a data processing apparatus 2 comprising two processors 4-0, 4-1. Each processor 4-0, 4-1 is coupled to a corresponding auxiliary circuit 8-0, 8-1 for providing auxiliary functions to the respective processors 4-0, 4-1. Comparison circuitry 10 is provided for comparing the processing results output by the processors 4-0, 4-1.

The processor 4-0 is permanently coupled to the auxiliary circuit 8-0. However, the processor 4-1 can be selectively coupled to either the auxiliary circuit 8-0 or the auxiliary circuit 8-1 by a multiplexer 12. The multiplexer 12 is controlled by a mode select signal to selectively couple the processor 4-1 to one of the auxiliary circuits.

During a split (performance) mode, the mode select signal controls a multiplexer 12 to couple the processor 4-1 to the auxiliary circuit 8-1. In this mode, each of the processors 4-0, 4-1 is controlled by a respective control signal 14-0, 14-1 and independently executes a different processing operation.

In a locked (safety) mode of operation, the mode select signal controls the multiplexer 12 to couple the processor 4-1 to the auxiliary circuit 8-0. In the locked mode, each processor 4-0, 4-1 executes a common processing operation in response to a single control signal 14-0 and shares the auxiliary circuit 8-0. In the locked mode, the auxiliary circuit 8-1 is not used and continues to store data stored in the auxiliary circuit 8-1 during the split mode. During the locked mode, processing results of the processors 4-0, 4-1 are compared by the comparison circuitry 10 and if a difference between the output of the respective processors is detected then an error is signalled. Error handling circuitry (not illustrated in FIG. 1) can be provided to handle detected errors.

During the locked mode, the auxiliary circuit 8-1 is unused and so a clamping circuit 16 is provided to prevent signals output by the processor 4-1 affecting the auxiliary circuit 8-1. This means that the auxiliary circuit 8-1 can continue to retain the context stored during the performance mode. During the performance mode, the clamping circuit 16 allows signals from the processor 4-1 to pass to the auxiliary circuit 8-1.

Figure 2:
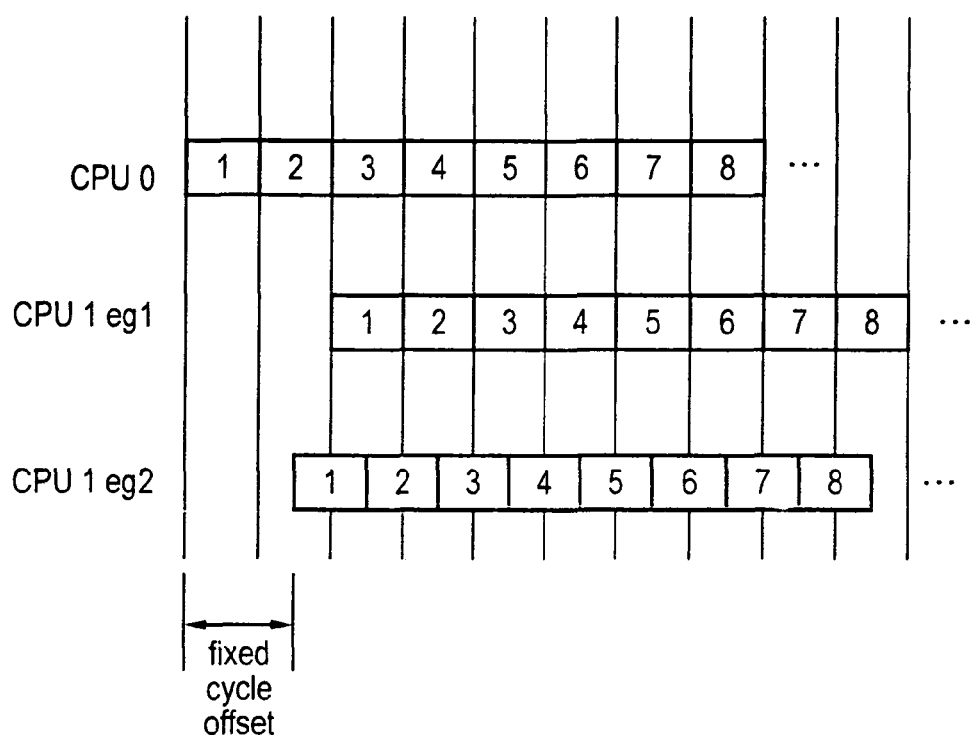
FIG. 2 illustrates a fixed cycle offset between different processors executing a common set of data processing operations.

Momentary glitches, such as power supply variations or electromagnetic interference, can cause momentary errors in the operation of the data processing apparatus 2. To detect such errors, the processors 4-0 and 4-1 are operated in a cycle-accurate manner with respect to one another, but offset from one another by a predetermined number of cycles. FIG. 2 shows an example of how each processor can execute a common set of processing operations. In a first example, the processing operations of the respective processors 4-0, 4-1 are offset by two processing cycles. In a second example, the processing operations of the respective processors are offset from one another by one and a half processing cycles. Other offsets are possible. By temporally displacing the execution of the common processing operation in the respective processors 4-0, 4-1, a momentary fault which affects the processors in different ways (e.g. a fault that affects one processor but not the other, or a fault that occurs at different stages of the processing operation in the respective processors) can be detected from a difference in the processing results produced by the processors 4-0, 4-1.

Referring again to FIG. 1, to account for this temporal offset in processing of the respective processors 4-0, 4-1, delaying elements 20 are provided on various signal paths of the data processing apparatus 2. A delaying element 20-1 (for example, a flip-flop) is provided on the signal path between the shared auxiliary circuit 8-0 and the multiplexer 12 on the way to the processor 4-1. The delaying element adds a fixed delay equivalent to the temporal offset and ensures that when the processor 4-1 accesses the shared auxiliary circuit 8-0, the value accessed is the same as the value accessed by the processor 4-0 the fixed number of cycles earlier. Similarly, a delaying element 20-2 is provided on the control signal line 14-0 to delay control signals passing to the processor 4-1 so that the processor 4-1 is controlled to execute the operations the fixed number of cycles later than the processor 4-0. Also, a third delaying element 20-3 is provided in the signal path between the processor 4-0 and the comparison circuitry 10 to delay the output of the processor 4-0 corresponding to the shared auxiliary circuit by the fixed number of cycles so that the comparison is performed once the output of the processor 4-1 becomes available.

By duplicating the auxiliary circuits 8-0, 8-1, then in the performance mode each processor 4-0, 4-1 can independently use the auxiliary circuit and so performance is increased. On the other hand, in the locked mode auxiliary circuit coherency is ensured because each processor uses the same auxiliary circuit.

The auxiliary circuit 8-0, 8-1 may comprise many different types of circuit component. Some examples of types of auxiliary circuit are illustrated in FIGS. 3A to 3G.

Figure 3A:
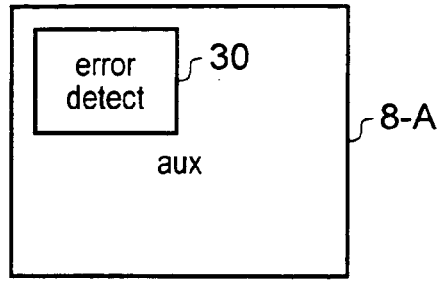
FIGS. 3A to 3G illustrate different types of auxiliary circuit.
Figure 3E:
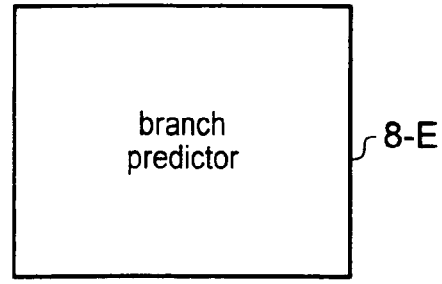

One type of auxiliary circuit which can be used for the present technique is a self-protecting auxiliary circuit 8-A which comprises error detecting logic 30 for detecting errors in operation of the self-protecting auxiliary circuit 8-A (see FIG. 3A). As the self-protecting auxiliary circuit 8-A has its own error detection capability, duplication of this circuit is not required during the locked mode and so coherency can be achieved by using only one shared auxiliary circuit 8-A during the locked mode.

Figure 3B:
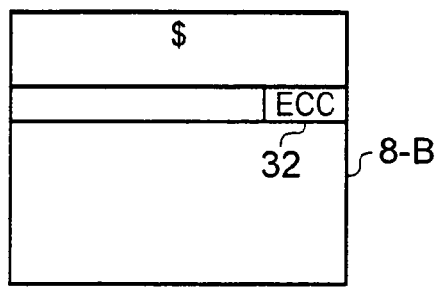
Figure 3F:
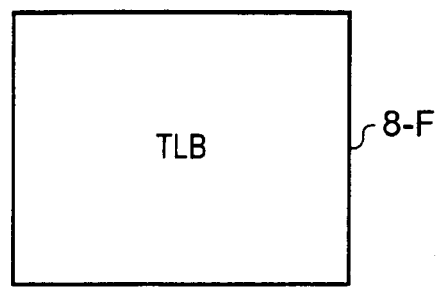
Figure 3C:
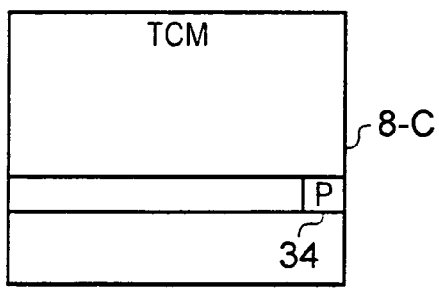
Figure 3G:
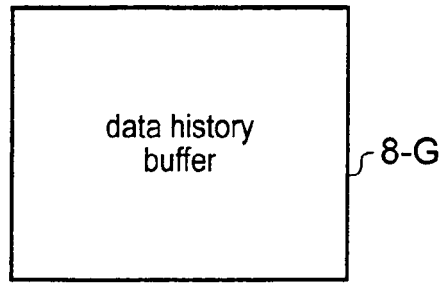
Figure 3D:
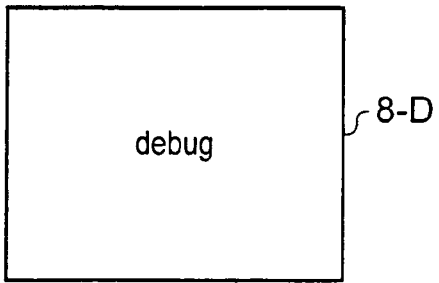

Other types of auxiliary circuit which can be used are a cache 8-B and a tightly coupled memory (TCM) 8-C (see FIGS. 3B and 3C). As such memories can be protected by error detection codes such as one or more of error correction codes 32 and parity codes 34, duplication of these components is not necessary for the locked mode and so the cache 8-B or the tightly coupled memory 8-C can be shared during the locked mode.

Further types of auxiliary circuit include a debug circuit (or monitoring circuit) 8-D, a branch predictor 8-E, a translation lookaside buffer 8-F and a data history buffer 8-G (see FIGS. 3C to 3G). Such circuits are non-safety-critical because their operation does not affect the correctness of the processing outputs of the processors 4-0, 4-1. The branch predictor 8-E, translation lookaside buffer 8-F and data history buffer 8-G affect only the performance level of the processors 4-0, 4-1, and not the result values and so it is not necessary to duplicate these circuits during locked mode. The debug circuit 8-D monitors processor operations, but does not affect the processing results. Thus, these circuits can be shared during the locked mode.

Other types of auxiliary circuit can also be devised. In general, any circuit which is duplicated in split mode to enhance processing performance, but in locked mode either does not need duplication for fault coverage (e.g. it has its own error detection function) or is non-safety-critical and does not need fault coverage, can be used as the auxiliary circuit 8-0, 8-1 in the present technique.

Figure 4:
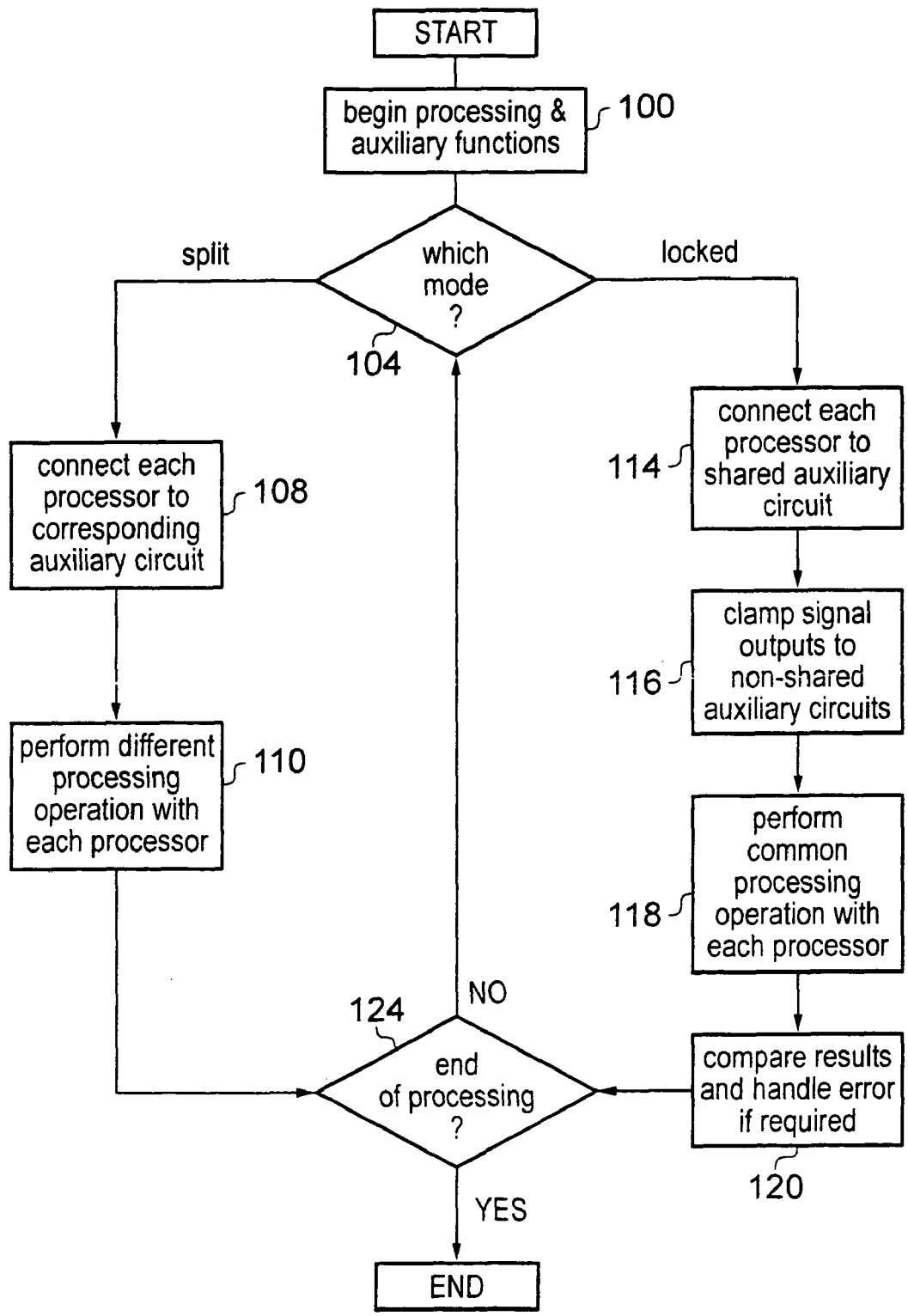
FIG. 4 illustrates a method for use in a split-lock data processing apparatus.

FIG. 4 illustrates a method of data processing using the split-lock processor 2 of the present technique. Processing begins at step 100 when the processors 4-0, 4-1 start performing processing operations using the auxiliary functions (such as cache storage, TLB translations, branch predictions, etc.) provided by the auxiliary circuits 8-0, 8-1. At step 104, the system selects which mode is to be used. For example, for safety-critical code such as the code which controls the application of anti-lock brakes, the locked mode would be selected, while for other code which is not safety-critical the split mode would be selected to increase performance level.

If the split mode is selected then at step 108, each processor 4-0, 4-1 is connected to the corresponding auxiliary circuit 8-0, 8-1. Thus, each auxiliary circuit provides auxiliary functions to a respective processor. The processors then each perform different processing operations at step 110, under control of the respective control signals 14-0, 14-1.

On the other hand, if the locked mode is selected, then at step 114, each processor is connected to the shared auxiliary circuit 8-0. At step 116, the clamping circuit 16 clamps a signal output from the processor 4-1 to the non-shared auxiliary circuit 8-1 so that the auxiliary circuit 8-1 is not affected by the processing results of the processor 4-1. The auxiliary circuit 8-1 can be made inactive if desired and/or can maintain the context of any previously executed split mode. At step 118 each processor is controlled by the common control signal 14-0 to perform the common processing operation in step with one another (cycle accurate, although with the fixed cycle offset). At step 120 the results of processing by each processor 4-0, 4-1 are compared by the comparison circuitry 10 and if a difference between the respective processing results is detected by the comparison circuitry 10, then an error is signalled and error handling circuitry handles the error.

Independently of whether the processing has been executed in the split mode or the locked mode, the method then proceeds to step 124, at which it is determined whether processing has finished. If processing has not finished then the method returns to step 104 at which the mode of operation the apparatus 2 is again determined. If processing has completed at step 124 then processing ends.

Figure 5:
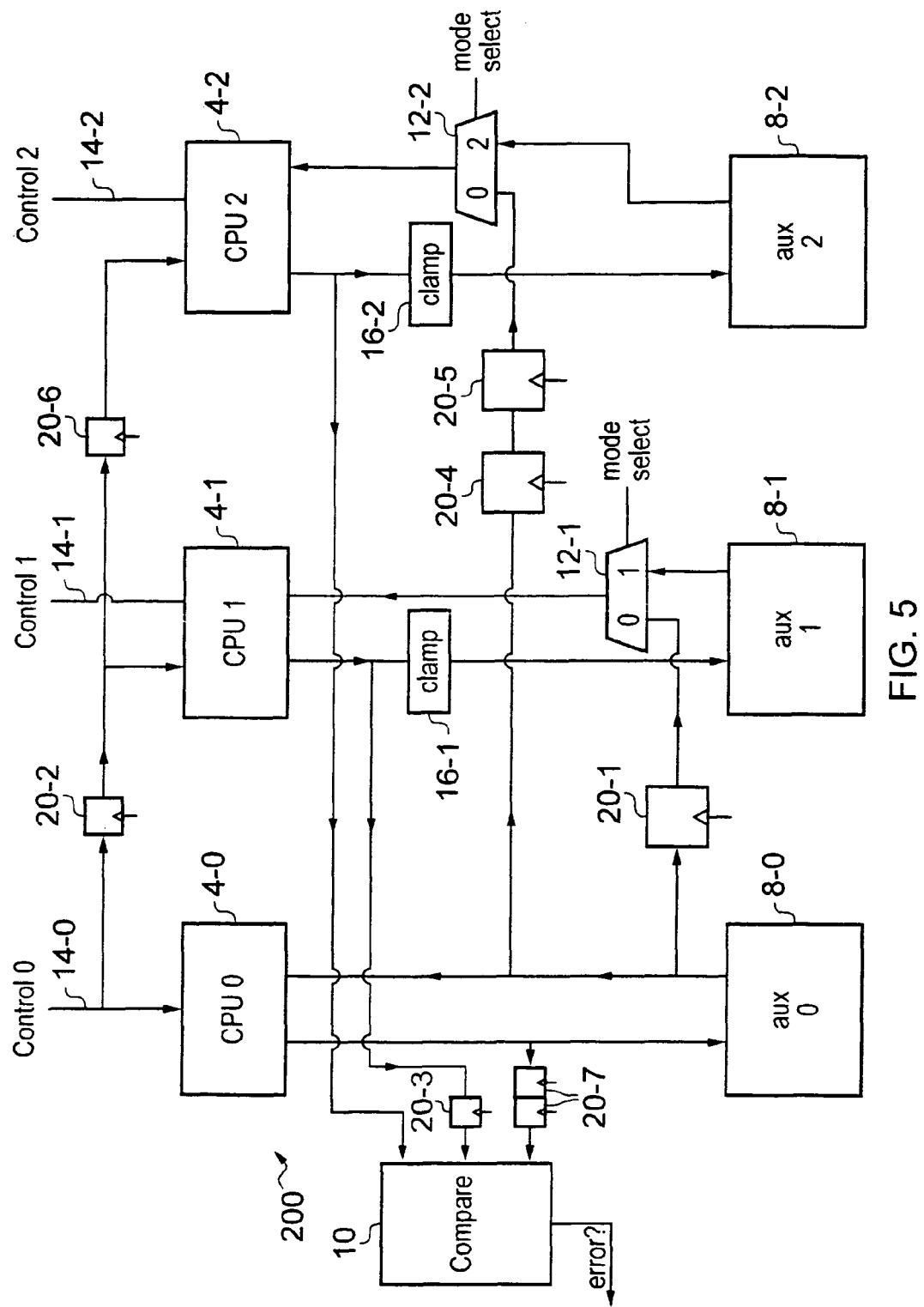
FIG. 5 illustrates another embodiment of a split-lock data processing apparatus.

The data processing apparatus 2 of FIG. 1 has two processors 4-0, 4-1. It is also possible to provide a split-lock processor with more than two processors. FIG. 5 illustrates a split-lock processor 200 comprising three processors 4-0, 4-1, 4-2. Each processor has a corresponding auxiliary circuit 8-0, 8-1, 8-2. The processor 200 is constructed in a similar manner to the processor 2 of FIG. 1 and so like components are illustrated with the same reference numerals.

In the split mode, each processor 4-0, 4-1, 4-2 is controlled by separate control signals 14-0, 14-1, 14-2 and executes a different set of processing operations using the auxiliary functions provided by the respective auxiliary circuit. In the locked mode, the multiplexers 12-1, 12-2 couple the processors 4-1, 4-2 to the shared auxiliary circuit 8-0 and the non-shared auxiliary circuits 8-1, 8-2 are not used (and can be placed in an inactive state if desired). In the locked mode each processor executes a common set of processing operations and the respective processing results calculated by each processor 4-0, 4-1, 4-2 are compared by the comparison circuitry 10. When there are three or more processors, if an error is detected then the error can be corrected since it is likely that when one processor produces a different result to the other processors, the result produced by the majority of the three or more processors is the correct result.

In the embodiment with three or more processors, then each processor is offset from previous processors by a fixed number of processing cycles and so different numbers of delaying elements (e.g. flip-flops) 20-1 to 20-7 are provided in the various signal paths of the apparatus 200.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. A data processing apparatus comprising:
    a plurality of processors configured to perform processing operations;
    a plurality of auxiliary circuits configured to provide auxiliary functions for said plurality of processors; and
    comparison circuitry configured to compare processing results of different processors of said plurality of processors; wherein:
    said plurality of processors have:
    (i) a locked mode of operation in which each of said plurality of processors separately performs a common processing operation to generate respective processing results, said respective processing results of different processors being compared by said comparison circuitry to identify incorrect operation; and
    (ii) a split mode of operation in which each of said plurality of processors performs a different processing operation to generate respective different processing results;
    in said split mode, each of said plurality of auxiliary circuits separately provides auxiliary functions for a corresponding one of said plurality of processors; and
    in said locked mode, a shared one of said plurality of auxiliary circuits provides auxiliary functions for all of said plurality of processors.

2. The data processing apparatus according to claim 1, wherein said plurality of auxiliary circuits comprise self-protecting circuits having error detection logic for detecting incorrect operation of said self-protecting circuits.

3. The data processing apparatus according to claim 1, wherein said plurality of auxiliary circuits comprise a plurality of cache memories.

4. The data processing apparatus according to claim 3, wherein said plurality of cache memories are configured to store error detection codes for detecting errors in data stored in said cache memories.

5. The data processing apparatus according to claim 4, wherein said error detection codes comprise at least one of parity codes for detecting errors in data stored in said cache memories and error correction codes for correcting errors in said data stored in said cache memories.

6. The data processing apparatus according to claim 1, wherein said plurality of auxiliary circuits comprise a plurality of tightly coupled memories.

7. The data processing apparatus according to claim 6, wherein said plurality of tightly coupled memories are configured to store error detection codes for detecting errors in data stored in said tightly coupled memories.

8. The data processing apparatus according to claim 7, wherein said error detection codes comprise at least one of parity codes for detecting errors in data stored in said tightly coupled memories and error correction codes for correcting errors in said data stored in said tightly coupled memories.

9. The data processing apparatus according to claim 1, wherein said plurality of auxiliary circuits comprise a plurality of debug circuits.

10. The data processing apparatus according to claim 1, wherein said plurality of auxiliary circuits comprise a plurality of branch prediction circuits.

11. The data processing apparatus according to claim 1, wherein said plurality of auxiliary circuits comprise a plurality of translation lookaside buffers.

12. The data processing apparatus according to claim 1, wherein said plurality of auxiliary circuits comprise a plurality of data history buffers.

13. The data processing apparatus according to claim 1, wherein, for each non-shared auxiliary circuit of said plurality of auxiliary circuits:
    a signal path between said non-shared auxiliary circuit and said corresponding one of said plurality of processors comprises a clamping circuit;
    in said split mode, said clamping circuit is configured to allow a processing result output by said corresponding one of said plurality of processors to be transferred to said non-shared auxiliary circuit; and
    in said locked mode, said clamping circuit is configured to prevent said processing result output by said corresponding one of said plurality of processors from being transferred to said non-shared auxiliary circuit.

14. The data processing apparatus according to claim 1, wherein in said split mode said plurality of auxiliary circuits are configured to store auxiliary state data on behalf of said plurality of processors; and
    after a switch from said split mode to said locked mode, at least one non-shared auxiliary circuit continues to store auxiliary state data that was stored during said split mode.

15. The data processing apparatus according to claim 1, wherein in said locked mode, the execution of said common processing operation by a first processor of said plurality of processors is offset from the execution of said common processing operation by a second processor of said plurality of processors by a fixed number of processing cycles.

16. The data processing apparatus according to claim 15, wherein said first processor executes said common processing operation ahead of said second processor executing said common processing operation; and
    a signal path between said second processor and a corresponding auxiliary circuit comprises delaying circuitry for delaying propagation of a signal from said corresponding auxiliary circuit to said second processor by an amount corresponding to said fixed number of processing cycles.

17. The data processing apparatus according to claim 1, wherein at least one non-shared auxiliary circuit of said plurality of auxiliary circuits is inactive during said locked mode.

18. A data processing apparatus comprising:
a plurality of processor means for performing processing operations;
a plurality of auxiliary means for providing auxiliary functions for said plurality of processor means; and
comparison means for comparing processing results of different processor means of said plurality of processor means; wherein:
said plurality of processor means have:
(i) a locked mode of operation in which each of said plurality of processor means separately performs a common processing operation to generate respective processing results, said respective processing results of different processor means being compared by said comparison means to identify incorrect operation; and
(ii) a split mode of operation in which each of said plurality of processor means performs a different processing operation to generate respective different processing results;
in said split mode, each of said plurality of auxiliary means separately provides auxiliary functions for a corresponding one of said plurality of processor means; and
in said locked mode, a shared one of said plurality of auxiliary means provides auxiliary functions for all of said plurality of processor means.

19. A data processing method comprising the steps of:
performing processing operations using a plurality of processors;
providing auxiliary functions for said plurality of processors using a plurality of auxiliary circuits;
in a locked mode of operation, separately performing a common processing operation with each of said plurality of processors to generate respective processing results, and comparing said respective processing results of different processors to identify incorrect operation; and
in a split mode of operation, performing a different processing operation with each of the plurality of processors to generate respective different processing results; wherein:
in said split mode, each of said plurality of auxiliary circuits separately provides auxiliary functions for a corresponding one of said plurality of processors; and
in said locked mode, a shared one of said plurality of auxiliary circuits provides auxiliary functions for all of said plurality of processors.

* * * * *